(12) United States Patent
Johnson

(10) Patent No.: US 6,859,686 B2
(45) Date of Patent: Feb. 22, 2005

(54) GESTICULATING ANTHROPOMORPHIC INTERFACE

(75) Inventor: Richard A. Johnson, Rochester Hills, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/305,383

(22) Filed: Nov. 26, 2002

(65) Prior Publication Data

US 2004/0102875 A1 May 27, 2004

(51) Int. Cl.$^7$ ............... G08G 1/123; G05D 1/00; G01C 21/00
(52) U.S. Cl. ............... 701/1; 701/36; 701/200; 701/211; 340/995.2; 340/995.26; 340/995.27
(58) Field of Search ............... 701/36, 48, 1, 701/200, 211, 206, 208, 209; 340/995.2, 995.26, 995.27

(56) References Cited

U.S. PATENT DOCUMENTS

| | | | |
|---|---|---|---|
| 6,175,772 B1 * | 1/2001 | Kamiya et al. ............... 700/31 |
| 6,178,378 B1 | 1/2001 | Leibold ............... 701/202 |
| 6,285,924 B1 * | 9/2001 | Okamoto et al. ............... 701/1 |
| 6,351,698 B1 * | 2/2002 | Kubota et al. ............... 701/51 |
| 6,424,912 B1 | 7/2002 | Correia et al. ............... 701/209 |
| 2002/0049534 A1 * | 4/2002 | Yuda et al. ............... 701/209 |
| 2003/0069687 A1 * | 4/2003 | Tsuyuki ............... 701/200 |

* cited by examiner

Primary Examiner—Thomas G. Black
Assistant Examiner—Brian J. Broadhead
(74) Attorney, Agent, or Firm—Kathryn A. Marra

(57) ABSTRACT

A method of providing a gesticulating anthropomorphic interface in a vehicle, the method comprising receiving driver input data including a function to be performed. The method also comprises receiving vehicle data corresponding to the function. The function is executed in response to the driver input data and the vehicle data and the executing results in output data. The output data is translated into a command for a gesticulating anthropomorphic figure. The gesticulating anthropomorphic figure is displayed making a gesture responsive to the command.

24 Claims, 2 Drawing Sheets

GESTICULATING ANTHROPOMORPHIC INTERFACE

BACKGROUND OF THE INVENTION

The present disclosure relates generally to a computer interface to a gesticulating anthropomorphic figure and in particular, to the use of a gesticulating anthropomorphic figure to communicate information to the operator of a vehicle.

Currently, it is possible for an operator to navigate a vehicle, such as a car, using an autonomous navigation system that is onboard the car and includes a database with directions and coordinates for various locations. The directions in an autonomous navigation system can be generated by a processor is located onboard the car. The processor accesses the database and calculates directions based on the current location of the vehicle and the intended destination. Autonomous navigation systems can become outdated as the coordinates, locations and points of interest stored in the database become outdated. An alternative to autonomous navigation systems is to communicate with a server that can calculate a navigation route and transmit it to the vehicle. Typically, in such a server based system, the current location of the vehicle is determined by the server using global positioning systems (GPS) and software. Dead reckoning systems such as gyroscopes or the use of the vehicle speed pulses may also be used to help determine the current location of the vehicle. The destination is also indicated to the server, for example, by user input. Then, the server generates a route based on these two points.

Route guidance can be thought of as a process whereby an entity, such as a navigation computer, that knows how to get to a specific destination conveys information to an entity, such as a driver, that desires such information. The navigation computer knows a strategic plan of what roads the driver can take to get to the destination. Ultimately, the driver must make low-level tactical steps (e.g., recognize intersections, turn the steering wheel) to actually get to the destination. Route guidance then is a transfer function between the navigation computer plan and the low level steps taken by the driver. Any process that can accomplish this transfer can be said to provide route guidance. A map can be presented on a screen that displays the vehicle in the center. If the system knows the destination, a route to the destination can be shown as a highlighted path on the map.

Navigating with a map to perform route guidance can require several mental steps for the driver. In order to use the map, the driver must recognize the representation of the vehicle on the map as the vehicle he is operating, and the lines and words on the display as the road network surrounding the vehicle. Another process for performing route guidance is to display a detailed picture of the next maneuver with the current street and turn street labeled. Typically, the displays are mounted high in the center stack of the instrument panel. The use of an audible voice to describe the next maneuver can also be utilized to accomplish route guidance. The use of voice may result in a lower amount of additional driver workload than that associated with map reading and the use of voice may still provide the required information to the driver. Driver workload is one consideration that can be weighed when determining how to convey navigation information or any other kind of information to the operator of a vehicle.

BRIEF DESCRIPTION OF THE INVENTION

In an exemplary embodiment, a method of providing a gesticulating anthropomorphic interface in a vehicle comprises receiving driver input data including a function to be performed. The method also comprises receiving vehicle data corresponding to the function. The function is executed in response to the driver input data and the vehicle data and the executing results in output data. The output data is translated into a command for a gesticulating anthropomorphic figure. The gesticulating anthropomorphic figure is displayed making a gesture responsive to the command.

In another aspect, a system for providing a gesticulating anthropomorphic interface to a vehicle comprises a gesticulating anthropomorphic figure and a network in communication with the figure. The system further comprises a microprocessor in communication with the network and including instructions to implement a gesticulating anthropomorphic interface method. The method comprises receiving driver input data including a function to be performed over the network. The method also comprises receiving vehicle data corresponding to the function over the network. The function is executed in response to the driver input data and the vehicle data and the executing results in output data. The output data is translated into a command for a gesticulating anthropomorphic figure. The gesticulating anthropomorphic figure is displayed making a gesture responsive to the command.

BRIEF DESCRIPTION OF THE DRAWINGS

Referring to the exemplary drawings wherein like elements are numbered alike in the several FIGURES.

DETAILED DESCRIPTION OF THE INVENTION

A method of providing a gesticulating anthropomorphic interface (GAI) in a vehicle is presented. Briefly stated, the GAI interfaces with a three dimensional poseable figure affixed to the interior of a vehicle or, alternatively, to a software generated image of a computer animated figure displayed on a display device affixed to the interior of a vehicle. In both cases, the figure is capable of gesturing, speaking and listening in response to commands from the GAI. As such, the interface includes the ability to cause the figure to move, as well as providing text-to-speech and speech recognition capabilities. The three dimensional poseable figure (e.g., a robot or a mechanical figure) could be affixed to the dashboard of a vehicle while the software generated image of a figure could be displayed on a screen located on top of the instrument panel. In an exemplary embodiment of the present invention, a primary function of the gesticulating anthropomorphic interface (GAI) is to provide the driver with an interface to a navigation system for location based information including route guidance. For example, if the next maneuver for the driver is to "get onto the 1696 expressway in one mile", the GAI might cause the figure to say "you can get on 1696 on the right here in about one mile," while at the same time the figure gestures to the right side of the vehicle off in the distance. As the vehicle nears the entrance the figure might say "okay, look for the 1696 entrance here on the right" while the figure again points to the right but this time at a larger angle indicating that the turn is coming up soon. In this way, the guidance is similar to what might take place if there were a very knowledgeable person sitting in the passenger seat. Other applications include interfaces to functions such as parking assistance and traffic assistance.

Figure 1:
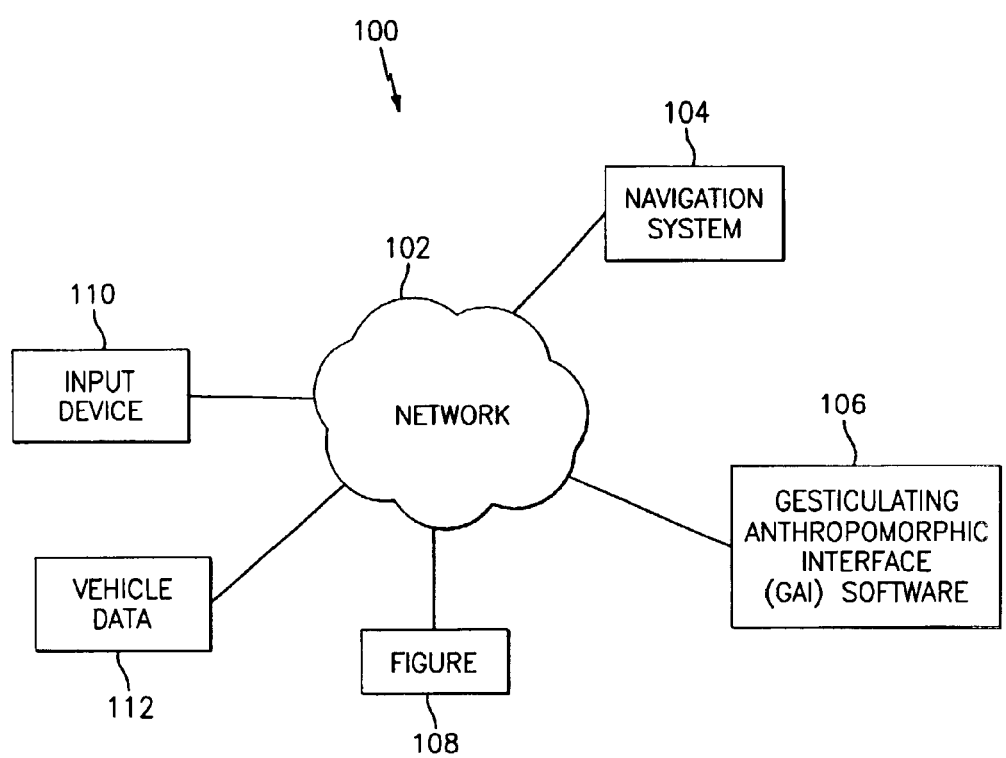
FIG. 1 is a block diagram of an exemplary gesticulating anthropomorphic interface system.

FIG. 1 is a block diagram of an exemplary GAI system 100 that includes an interface to a navigation system 104. GAI software 106 coordinates the input and output among the components depicted in FIG. 1 in order to manipulate and display the gesticulating anthropomorphic FIG. 108. The display of the gesticulating anthropomorphic FIG. 108 can include manipulating a three dimensional poseable FIG. 108 (e.g., a robot or a mechanical figure) that is affixed to the interior of a vehicle (e.g., the dashboard). Any three dimensional poseable FIG. 108 known in the art (e.g. a human version of Sony's Entertainment Robot AIBO, a smaller version of Hiroaki Kitano's PINO Platform humanoid robot) that can fit in the vehicle can be utilized with an embodiment of the present invention. In an alternate embodiment, the gesticulating anthropomorphic FIG. 108 is a computer animated FIG. 108 that is displayed on a display device (e.g., computer screen) affixed to the interior of a vehicle. Any computer animated FIG. 108 generator known in the art that can respond to command signals to make gestures can be utilized with an embodiment of the present invention. The gesticulating anthropomorphic FIG. 108 includes at least one member (e.g., an arm for pointing, eyebrows that raise, a leg for simulating a braking action) that moves in dependence upon a control signal received by the GAI software 106. Control signals, or commands, generated by the GAI software 106 associated with the gesticulating anthropomorphic figure, direct the motion and words of the FIG. 108. The GAI software 106 may include text to voice translation so that the FIG. 108 can verbally describe information to the operator of the vehicle along with gesturing motions.

Referring to FIG. 1, the GAI system 100 for use with navigation functions includes a navigation system 104 that may be any suitable hardware or software configuration, or combination of hardware and software that is configured to generate a route and process route information. Generating a route includes the ability to calculate routes from the current location of the vehicle to a specified location. The route generation portion of the navigation function software can calculate routes, portions of a route or route coordinates. The route generation software can be in communication with a coordinate database that stores location coordinates for a variety of locations (e.g., points of interest). The coordinate database may also include street addresses and routes between points. The route generation software may generate routes in any manner known in the art. Until the route has been completed or changed to a new destination, a next target location exists which may represent a point along the route. The target location may be an intersection, a point of interest or the final destination associated with the route. The navigation system 104 transmits the target location to the GAI software 106, via the network 102. The vehicle data 112, including current location of the vehicle and the current heading direction of the vehicle, is calculated from devices located onboard the vehicle and is transmitted to the GAI software 106 via the network 102. In an alternate embodiment, the target location, current location of the vehicle and current heading direction of the vehicle are sent from the navigation system 104 to the GAI software 106 via the network 102.

The GAI system 100 includes a network 102. The network 102 is utilized to transfer data among the various components of the GAI system 100. The network 102 may be any network known in the art including a wireless network. In addition, the network 102 may be completely internal to the vehicle or it may include components that are external to the vehicle. For example, the input device 110, vehicle data 112, FIG. 108 and GAI software 106 components may be connected to a portion of the network 102 that is internal to the vehicle and the navigation system 104 connected to a portion of the network 102 that is external to the vehicle. In this example, communication occurs between the two portions of the network 102 to transmit data for use by the GAI software 106 to direct the FIG. 108.

Data may be entered into the GAI system 100 through an input device 110. The input device 110 can be utilized to enable particular vehicle functions (e.g., parking assistance, navigation) and to enter user data required by the vehicle functions (e.g., destination). The input device 110 can accept a variety of input formats including keypad entry and voice. An input device 110 that accepts voice entries includes voice recognition software to translate the speech to text for input to the navigation system 104. For example, a driver may ask the input device 110 "where is the nearest gas station" and the input device 110 would respond by translating the verbal question into text and then sending it to the navigation system 104. The navigation system 104 would calculate a target location and send it to the GAI software 106. The GAI software 106 would then determine the angle between the current heading direction and the target location and send a command to the gesticulating anthropomorphic FIG. 108. The FIG. 108 would then point to the nearest gas station and verbally describe the location of the gas station to the driver in response to the command from the GAI software 106. The translation of the navigation system 104 text to words to be spoken to the driver could be performed by a text to voice translation device attached to the FIG. 108. Once the point of interest, or new target location, has been displayed, the navigation system 104 could then go back to continuing to transmit data relating to the original route to the GAI software 106.

Various configurations of the GAI system 100 can be implemented. For example, all of the components described in FIG. 1 may be included in a single device located inside the vehicle thereby eliminating the need for the network 102. In another embodiment, the navigation system 104 is located outside the vehicle and accessed through the network 102 while the other components are located inside the vehicle as a single component. In a further embodiment, the gesticulating anthropomorphic FIG. 108 is located in a separate physical device from the other components and receives GAI software 106 commands over the network 102.

Figure 2:
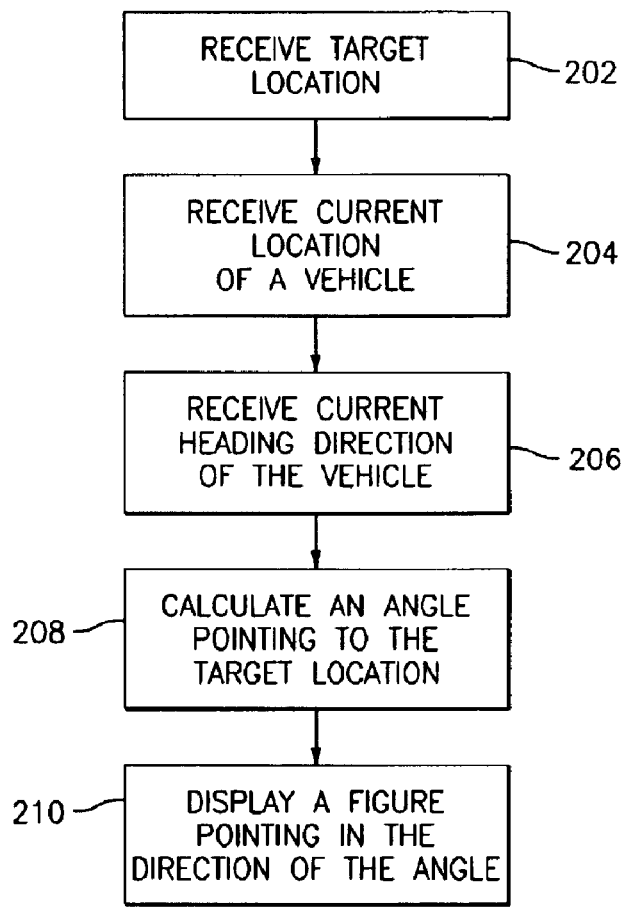
FIG. 2 is a flowchart of an exemplary process for providing a gesticulating anthropomorphic interface to a navigation function utilizing an embodiment of the present invention.

As described above, the GAI software 106 is connected to a navigation system 104 and has a knowledge of the environment outside of the vehicle including maneuvers that can guide the driver to a destination. It knows the locations (e.g., GPS coordinates) of landmarks and intersections. It also knows the position and heading of the vehicle. Given this information it is possible to calculate the angle that the gesticulating anthropomorphic FIG. 108 must point in order to point towards the landmark or intersection. This process of calculating the angle and the resulting display can be performed as shown in the steps depicted in FIG. 2. At step 202, the GAI software 106 receives target location data from a navigation system 104. The target location can include items such as landmarks and intersections and can be expressed as GPS coordinates. A destination may have been entered by the vehicle operator through the input device 110 using a keypad or speech recognition software. The destination can be translated by the navigation system 104 into a target location expressed as coordinates. Alternatively, the target location may be calculated by the navigation system 104 as an interim target along a route developed by the navigation system 104 to lead the driver to a final destination. Next, at step 204, the current location of the vehicle is received from a navigation system 104 or from vehicle data 112 gathered from a device attached to the vehicle. The current location (e.g., expressed in GPS coordinates) can be updated on a periodic basis or in response to changes in the location of the vehicle. At step 206, the current heading direction of the vehicle is received from a navigation system 104 or from vehicle data 112 gathered from a device attached to the vehicle.

An angle pointing to the target location is calculated at step 208. In an exemplary embodiment, the angle is calculated as follows. A reference heading, "$H_R$" is selected. The reference heading is typically north and represents the "y" axis in an x-y plane. Next, the vehicle heading, "$H_V$", is measured directly from the GPS with respect to the reference heading. Then, the vehicle position, "V" is measured from the GPS. The intersection point, or target location, coordinates are retrieved from a database. The heading, "$H_I$", with respect to "$H_R$" can be computed as:

$$H_I = \tan^{-1}(x_f - x_V)/(y_f - y_V).$$

The angle that the gesticulating anthropomorphic figure must point towards with respect to the vehicle heading then is:

$$(H_I - H_V).$$

At step 210, the GAI software 106 sends a command to the gesticulating anthropomorphic FIG. 108 to point in the direction of the angle that was calculated in step 208. In addition to the pointing, the GAI software 106 could direct that a text to voice translation device be utilized to speak to the operator of the vehicle through the FIG. 108.

Figure 3:
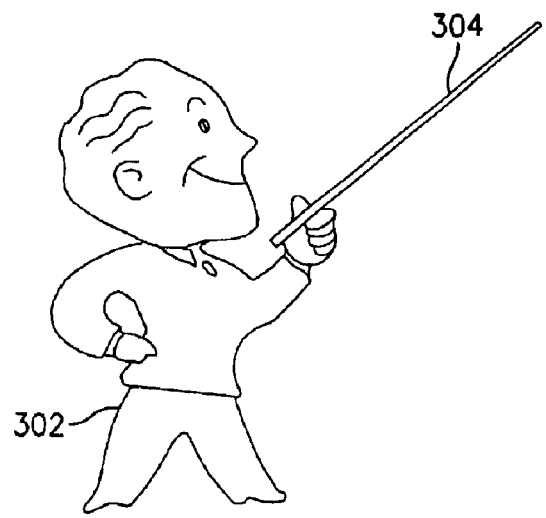
FIG. 3 is an exemplary embodiment of a gesticulating anthropomorphic figure that can be depicted on a display device located in the vehicle.

FIG. 3 is an exemplary embodiment of a gesticulating anthropomorphic FIG. 108 that can be depicted on a computer screen located in the instrument panel of a vehicle. FIG. 3 shows a human FIG. 302 that is pointing in a northeast direction with a pointer 304. The human FIG. 302 can be represented in any format that is available in the art, including a cartoon format as shown in FIG. 3. In addition, the human FIG. 302 could be represented in a format that simulates a realistic looking and acting human in an effort to approximate the experience of interacting with a live human. The pointer 304 can be a variety of devices for indicating a direction including the hand or arm of the human FIG. 302. In addition to pointing, the human FIG. 302 could speak to the operator of the vehicle and react to spoken words from the operator as described previously.

An exemplary embodiment of the present invention could further include utilizing the GAI system 100 to provide information to the driver even if gesturing is not important to the conveyance of that information. The driver could engage the GAI system 100 in a dialog about whatever subject the GAI system 100 is knowledgeable. For example, the GAI system 100 could be integrated with an automotive telematics system and could display gestures relating to telematic data. In an exemplary embodiment, the GAI system 100 is integrated with a parking assistance function and the gesticulating anthropomorphic FIG. 108 indicates the distance (e.g., distance between hands, verbally) between the bumper on the vehicle and a stationary object outside the car. The park assist function can determine the distance to other parked vehicle or object via optical, ultrasonic, radar or other sensors. That distance can be scaled to the size of the anthropomorphic figure and conveyed to the driver via the distance between the figure's hands. In another embodiment, the GAI system 100 is integrated with a traffic assistance function and the gesticulating anthropomorphic FIG. 108 gestures for the driver to slow down (e.g., simulates brake motion with leg) in response to the driver speed or closeness to the bumper of another vehicle. Again, the driver would interact with the GAI system 100 in a manner similar to how the driver would interact with a knowledgeable person in the passenger seat. Additionally, the GAI system 100 could be utilized in conjunction with a gaze tracker and the FIG. 108 could appear to be looking in the direction that the driver is looking. Any gestures by the FIG. 108 that could be useful to the driver of the vehicle could be implemented by the GAI system 100.

The disclosed invention provides the ability to communicate information to the operator of a vehicle in a very natural manner, through the use of a gesticulating anthropomorphic FIG. 108. Using a human figure to make gestures, such as pointing, may require less thought, or cognitive effort, on the part of the driver to understand instructions (e.g., navigation directions). This can result in a decrease in the amount of driver workload required to operate devices located inside the vehicle (e.g., a navigation device).

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for providing a gesticulating anthropomorphic interface in a vehicle, the system comprising:

a gesticulating anthropomorphic figure;
a network in communication with said figure; and
a microprocessor in communication with said network, said microprocessor including instructions to implement a gesticulating anthropomorphic interface, the method comprising:
receiving driver input data including a function to be performed over said network, wherein the function includes parking assistance;
receiving vehicle data corresponding to said function over said network, said vehicle data including the location of a bumper on the vehicle relative to an external object;
executing said function in response to said driver input data and said vehicle data, said executing resulting in output data;
translating said output data into a gesticulating anthropomorphic figure command; and
displaying said gesticulating anthropomorphic figure making a gesture responsive to said command, said gesture indicating the distance between the bumper and the external object.

2. The system of claim 1 wherein said network is a wireless network.

3. The system of claim 1 wherein said network is internal to said vehicle.

4. The system of claim 1 wherein said figure is a three dimensional poseable figure affixed to the interior of said vehicle.

5. The system of claim 1 wherein said figure is a computer animated figure viewable on a display device affixed to the interior of said vehicle.

6. A method of providing a gesticulating anthropomorphic interface in a vehicle, the method comprising:
receiving driver input data including a function to be performed, wherein said function includes parking assistance;
receiving vehicle data corresponding to said function, said vehicle data including the location of a bumper on the vehicle relative to an external object;
executing said function in response to said driver input data and said vehicle data, said executing resulting in output data;
translating said output data into a command for a gesticulating anthropomorphic figure; and
displaying said gesticulating anthropomorphic figure making a gesture responsive to said command, said gesture indicating the distance between the bumper and the external object.

7. The method of claim 6 wherein said gesticulating anthropomorphic figure is a three dimensional poseable figure affixed to the intedor of said vehicle.

8. The method of claim 6 wherein said gesticulating anthropomorphic figure is a computer animated figure viewable on a display device affixed to the interior of said vehicle.

9. The method of claim 6 further comprising displaying said figure making a verbal communication responsive to said command.

10. The method of claim 6 wherein said driver input date is entered using a keypad entry device.

11. The method of claim 6 wherein said driver input data is entered using a voice recognition device.

12. A method of providing a gesticulating anthropomorphic interface in a vehicle, the method comprising:
receiving driver input data including a function to be performed and a target location for said vehicle, wherein said function includes navigation;
receiving vehicle data corresponding to said function, said vehicle data including a cunnnt location and a current heading direction;
executing said function in response to said driver input data and to said vehicle data, said executing resulting in output data and said executing including calculating an angle with respect to said current heading direction and responsive to said current location that points in the direction of said target location;
translating said output data into a command for a gesticulating anthropomorphic figure; and
displaying said gesticulating anthropomorphic figure making a gesture responsive to said current, said gesture indicating the direction of said angle.

13. The method of claim 12 wherein said target location and said current location are expressed in terms of latitude, longitude and altitude.

14. The method of claim 12 wherein said receiving vehicle data occurs in response to a change in said current location.

15. The method of claim 12 wherein said receiving vehicle data occurs on a periodic basis.

16. The method of claim 12 wherein said receiving vehicle data occurs in response to a change in said current heading direction.

17. The method of claim 12 wherein said receiving driver input data occurs in response to a change in said target location.

18. A system for providing a gesticulating autbropomorphic interface in a vehicle, the system comprising:
a gesticulating anthropomorphic figure;
a network in communication with said figure; and
a microprocessor in communication with said network, said microprocessor including instructions to implement a gesticulating anthropomorphic interface, the method comprising:
receiving driver input data including a function to be performed and a target location for said vehicle, wherein said driver input data is received over said network and said function includes navigation;
receiving vehicle data corresponding to said function over said network, said vehicle data including a current location and a current heading direction;
executing said function in response to said driver input data and said vehicle data, said executing resulting in output data and said executing including calculating an angle with respect to said current heading direction and responsive to said current location that paints in the direction of said target location;
translating said output data into a gesticulating anthropomorphic figure command; and
displaying said gesticulating anthroporncnpliic figure making a gesture responsive to said current, said gesture indicating the direction of said angle.

19. The system of claim 18 further comprising a location detector device attached to said vehicle and to said network, wherein said current location is received from said device over said network.

20. The system of claim 18 further comprising a heading direction detector device attached to said vehicle and to said network, wherein said current heading direction is received from said device over said network.

21. The system of claim 18 further comprising a navigation system connected to said network, wherein said target location is received from said navigation system.

22. A method of providing a gesticulating anthropomorphic interface on a vehicle, the method comprising:
  receiving driver input data including a function to be performed, wherein said function includes traffic assistance;
  receiving vehicle data corresponding to said function, the vehicle data including at least one of speed of said vehicle and a bumper distance of said vehicle from an external object;
  executing said function in response to said driver input data and said vehicle data, said executing resulting in output data;
  translating said output data into a command for a gesticulating anthropomorphic figure, said command including instructions for moving a member on the figure to simulate braking if said speed is over a first limit or if said bumper distance is less than a second limit; and
  transmitting said command to said gesticulating anthropomorphic figure.

23. The method of claim 22 wherein the member is a leg.

24. A system for providing a gesticulating anthropomorphic interface in a vehicle, the system comprising:
  a gesticulating anthropomorphic figure;
  a network in communication with said figure; end
  a microprocessor in communication with said network, said microprocessor including instructions to implement a gesticulating anthropomorphic interface, the method comprising:
  receiving driver input data including a function to be performed, wherein said driver input data is received over said network and said function includes traffic assistance;
  receiving vehicle data corresponding to said function over said network, said vehicle data including at least one of a speed of said vehicle and a bumper distance of said vehicle from an external object;
  executing said function in response to said driver input data and said vehicle dab, said executing resulting in output data;
  translating said output data into a gesticulating anthropomorphic figure command; and
  displaying said gesticulating anthropomorphic figure making a gesture responsive to said command, said gesture including moving a member on the figure to simulate braking if said speed is over a first limit or if said bumper distance is less than a second limit.

* * * * *